June 7, 1927.　　　　　G. L. WALLIS　　　　1,631,443
MOTOR CYCLE
Filed Jan. 30, 1926　　　2 Sheets-Sheet 1
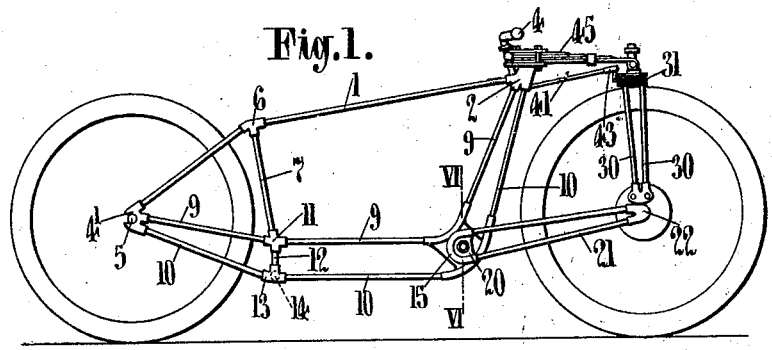
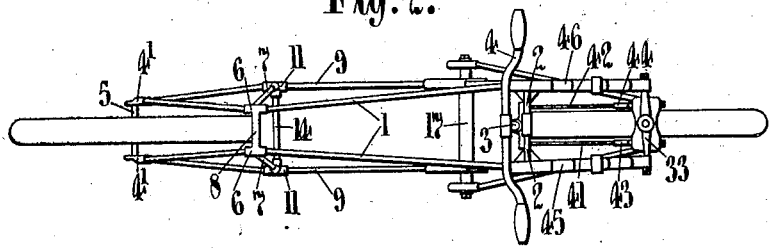
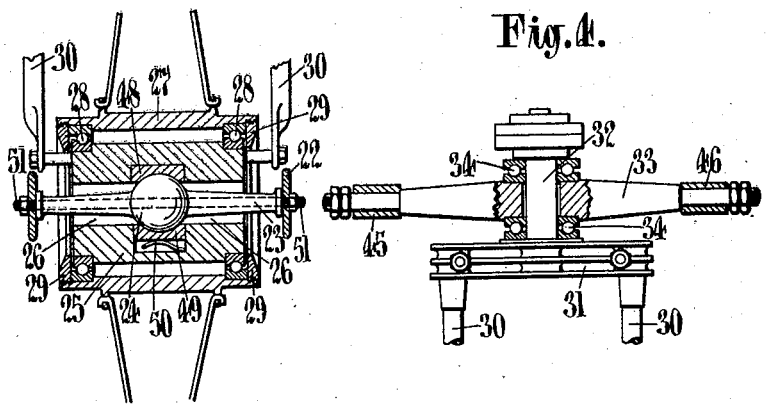

June 7, 1927.  G. L. WALLIS  1,631,443
MOTOR CYCLE
Filed Jan. 30, 1926   2 Sheets-Sheet 2
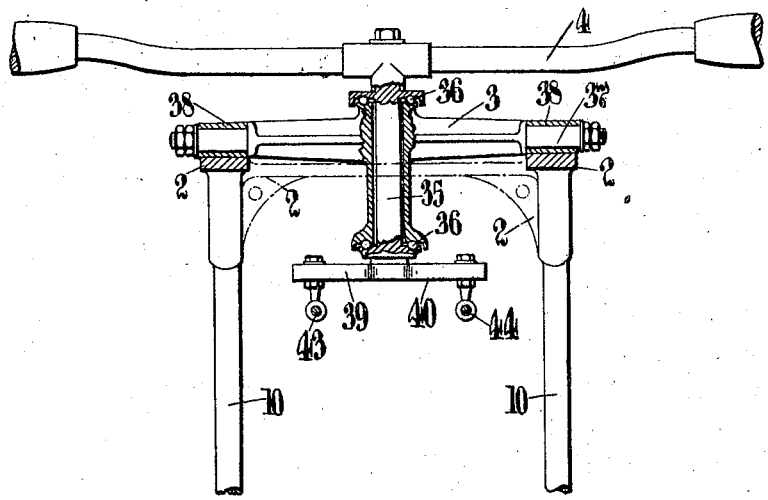
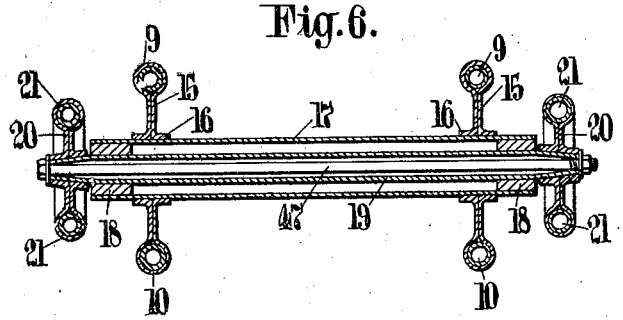
INVENTOR
G. L. WALLIS,
BY
ATTORNEY Patented June 7, 1927.

1,631,443

UNITED STATES PATENT OFFICE.

GEORGE LESLIE WALLIS, OF BROMLEY, ENGLAND.

MOTOR CYCLE.

Application filed January 30, 1926, Serial No. 85,037, and in Great Britain January 30, 1925.

My invention relates to motor cycles.

My invention has for its object to provide an improved motor cycle in which the position of the centre of gravity is materially lowered and in which wheel wobble at high speeds is practically eliminated.

Referring now to the accompanying drawings,

Figure 1, shows a side elevation of a motor cycle frame constructed according to my invention, while, Figure 2, shows a plan of the frame shown in Figure 1.

Figure 3, shows a detail view, in vertical section of the mounting of the front wheel on the motor cycle frame shown in Figure 1.

Figure 4, shows a detail view of the mounting of the front wheel fork.

Figure 5, shows a detail view of the handle-bar mounting.

Figure 6, shows a section of the frame through the line VI—VI, on Figure 1.

In carrying my invention into effect, according to one form, I arrange two laterally spaced tubes, 1, Figures 1 and 2, as the top members of the cycle frame, these tubes being attached at their forward ends to a stamping, 2, carrying the member, 3, on which the handle-bars, 4, are mounted. The rear ends of the tubes, 1, are attached to the stampings, 4', carrying the rear axle, 5.

On the tubes, 1, sockets, 6, are disposed, the stems of these sockets carrying the upper ends of the pillar stays, 7.

The sockets, 6, are interconnected by a transverse tube, 8, and the saddle is secured either to this tube or to the tubes, 1, in any suitable manner.

The bottom members of the frame are formed of two sets of vertically spaced tubes, each set comprising tubes, 9 and 10, which extend from the stamping carrying the rear axle, 5, to the stamping, 2, which carries the mounting for the handle bars.

The tubes of the top and bottom members of the frame are secured to the stampings, 2 and 4', by welding, brazing and pinning, or in any other suitable manner.

The pillar stays, 7, at their lower ends, are secured in sockets, 11, disposed on the tubes, 9, and vertical stay tubes, 12, are arranged between the sockets, 11, and sockets, 13, disposed on the tubes, 10.

The tubes, 10, of the bottom members are interconnected by a transverse stay tube, 14.

The tubes, 9 and 10, of the bottom members are inclined downwards from their rear ends to the junction of the pillar stays therewith and then extend horizontally for a certain distance, after which they are bent and inclined upwards to join the stamping, 2.

Stiffening members, 15, Figures 1 and 6, are inserted between the tubes, 9 and 10, of each bottom member and are secured to these tubes by welding, brazing or in any other suitable manner.

The stiffening members, 15, have sockets, 16, formed thereon in which a transverse tube, 17, extending between the bottom members, is secured. In each end of the tube, 17, an internal bearing, 18, is arranged for an inner tube, 19, having tapered ends.

On the ends of the tube, 19, socket pieces, 20, are arranged, each socket piece having secured thereto a tube, 21, bent in the form of an open-ended loop, the open ends of which are attached to the stamping, 22, carrying the axle for the front wheel. The socket pieces, 20, are secured in position on the tube, 19, by the through-going bolt, 47.

Instead of an open-ended loop, in some cases, I may use a closed loop or in other cases two vertically spaced tubes.

The member, 23, Figure 3, of the axle for the front wheel has a ball, 24, formed at the centre of its length, the ball being mounted in a socket member, 25, constructed in halves which are secured together in any suitable manner with the joint of the halves disposed horizontally. The socket member, 25, has laterally flared openings, 26, formed therein so as to permit the necessary movements of the socket member, 25, relatively to the axle, when steering.

The upper surface of the ball, 24, rests on a bearing, 48, preferably of phosphor bronze, while the lower surface of this ball rests on a similar bearing, 49, which is however resiliently mounted on a star-shaped spring, 50. The member, 23, of the front wheel axle is secured in position by means of the through-going bolt, 51.

Each end of the socket member, 25, is reduced in diameter and between the reduced portions and the hub, 27, of the wheel, ball bearings, 28, are disposed. Locking rings, 29, are arranged on the hub to secure the ball bearings in position.

The lower ends of the fork, 30, for the front wheel are rigidly attached to the socket member, 25, the fork being formed of two spaced tubes arranged at each side of the wheel and secured at their upper ends to a crown piece, 31. The crown piece, 31, Figure 4, carries a stud, 32, on which a double-armed member, 33, is mounted on ball bearings, 34.

The pillar, 35, Figure 5, of the handlebars, 4, is mounted on thrust ball bearings, 36, on the member, 3, which has trunnions, 37, formed thereon, the trunnions being mounted in bearings, 38, carried by the stamping, 2.

On the pillar, 35, oppositely disposed lugs, 39 and 40, are formed or attached, the lugs being connected to the crown-piece, 31, by rods, 41 and 42, Figures 1 and 2, which have ball and socket connections, 43 and 44, to the crown-piece and also to the lugs.

On the stamping, 2, the rear ends of two cantilever springs, 45 and 46, are attached, Figures 1 and 2, the forward ends of the springs being secured to the arms of the member, 33, Figure 4.

The fuel tank may be disposed within the frame and attached in any suitable manner to the top members thereof, while the motor, if of the single cylinder type, may be arranged with the axis of the cylinder more or less horizontal.

When the motor is of the twin-cylinder type, the axes of the cylinders may be symmetrically disposed about the horizontal.

The power may be transmitted from the motor through transmission mechanism of any suitable type, the drive to the rear wheel being preferably a chain drive.

From the above arrangement, it will be seen that steering movements of the handlebars are transmitted through the rods, 41 and 42, above described, to the fork, 30, and as the latter is rigidly attached to the socket member, 25, within the hub of the wheel, the member, 25, and consequently the front wheel, is moved to correspond to movements of the handle-bars. Further the trunnions on which the handle-bar mounting is carried, enables the handle-bars to move slightly in response to vertical or steering movements of the wheel.

Owing to the method of mounting the front wheel, vibrations arising from inequalities of the road surface, are effectively damped, and wheel wobble at high speeds is prevented. Further on the front wheel being deflected by inequalities on the road surface, it automatically returns to the central position after deflection thus providing a machine of very great stability.

By means of my invention, a motor cycle is provided, which is especially adapted for high speeds, as the handle-bars, saddle and centre of gravity of the machine is materially lowered in comparison with existing constructions, while owing to the duplication and arrangement of the frame tubes, an exceedingly light yet rigid frame may be produced.

Modifications in detail and arrangement may be made in the example of my invention above described.

I claim:—

1. In a motor cycle, the combination of, a frame, a wheel, co-acting articulated members on which said wheel is mounted together with arms attached to said frame, certain of which are pivoted and certain others resilient, said pivoted arms being connected on one of said articulated members and said resilient arms to the other of said articulated members.

2. In a motor cycle, the combination of, a frame, a wheel, co-acting universal joint members on which said wheel is mounted together with arms attached to said frame, certain of which are pivoted and certain others resilient, said pivoted arms being connected to one of said joint members and said resilient arms being connected to the other of said joint members.

3. In a motor cycle, the combination of, a frame, a wheel, ball and socket joint members on which said wheel is mounted together with arms attached to said frame, certain of which are pivoted and certain others of which are resilient, said pivoted arms being connected to one of said joint members and said resilient arms to the other of said joint members.

4. In a motor cycle, the combination of a frame, a wheel, coacting articulated members on which said wheel is mounted, arms pivoted to said frame carrying one of said articulated members, cantilever spring members carried by said frame together with a fork rotatably mounted on said spring members and attached to the other of said articulated members.

5. In a motor cycle, the combination of a frame, a wheel, co-acting universal joint members on which said wheel is mounted, arms pivoted to said frame and carrying one of said universal joint members, cantilever spring members carried by said frame together with a fork rotatably mounted on said spring members and attached to the other of said universal joint members.

6. In a motor cycle, the combination of a frame, a wheel, co-acting ball and socket joint members on which said wheel is mounted, arms pivoted to said frame and carrying said ball member, cantilever spring members carried by said frame, a fork rotatably mounted on said spring members and attached to said socket member.

7. In a motor cycle, the combination of a frame, a wheel, co-acting articulated members on which said wheel is mounted, a fork resiliently mounted on said frame and attached to one of said articulated members together with arms pivoted to said frame and carrying the other of said articulated members.

8. In a motor cycle, the combination of a frame, a wheel, co-acting universal joint members on which said wheel is mounted, a fork resiliently mounted on said frame and carrying one of said joint members together with arms pivoted to said frame and carrying the other of said joint members.

9. In a motor cycle, the combination of a frame, a wheel, co-acting ball and socket joint members on which said wheel is mounted, a fork resiliently mounted on said frame and carrying one of said joint members together with arms pivoted to said frame and carrying the other of said joint members.

10. In a motor cycle, the combination of a frame, a wheel, axle having a ball formed thereon, means movable about a transverse axis on said frame for carrying said axle, a wheel, a socket member for said axle and carrying said wheel, ball bearings interposed between said wheel and socket members, a fork connected to said socket member together with spring means mounted on said frame and carrying said fork.

11. In a motor cycle, the combination of a frame having duplicated bent-up lower members, a tube interconnecting said lower members, bearings in said tube, a movable member mounted in said bearings in said tube, forwardly extending arms attached to said movable member, a wheel axle having a ball formed thereon, a wheel, a socket member interposed between said wheel and said axle, ball bearings interposed between said wheel and said socket member, a fork attached to said socket member together with resilient arms attached to said frame and on which said fork is rotatably mounted.

12. In a motor cycle, a frame, a universal joint mounting supported in advance of the frame, a wheel in said mounting, a resilient support extending from the frame, and a fork connected to the universal joint mounting and support for rotative movement relative to the resilient support.

13. In a motor cycle, the combination of a frame, a wheel, means for resiliently supporting said wheel in advance of said frame together with a universal joint mounting for said wheel.

14. In a motor cycle, the combination of a frame, a wheel, means for resiliently supporting said wheel in advance of said frame together with a ball-joint mounting for said wheel.

15. In a motor cycle, the combination of a main frame having movable frame means attached thereto, certain of the members of said movable frame means being resiliently supported from the main frame and certain others being pivoted for vertical play to said main frame, said movable frame means having a wheel mounting interposed at an angular point.

16. In a motor cycle, the combination of a frame, a wheel together with a universal joint, means for guiding the play of the universal joint vertically of the frame, and means for cushioning such play.

17. In a motor cycle, the combination of a frame, a wheel, together with a ball joint between said frame and wheel, means pivotally connected to the frame at one point for supporting the ball joint and means resiliently connected to the frame at another point for further supporting the ball joint.

In testimony whereof I have signed my name to this specification.

GEORGE LESLIE WALLIS.